COLOR TELEVISION SIGNAL SEPARATION SYSTEM
Filed Sept. 11, 1967
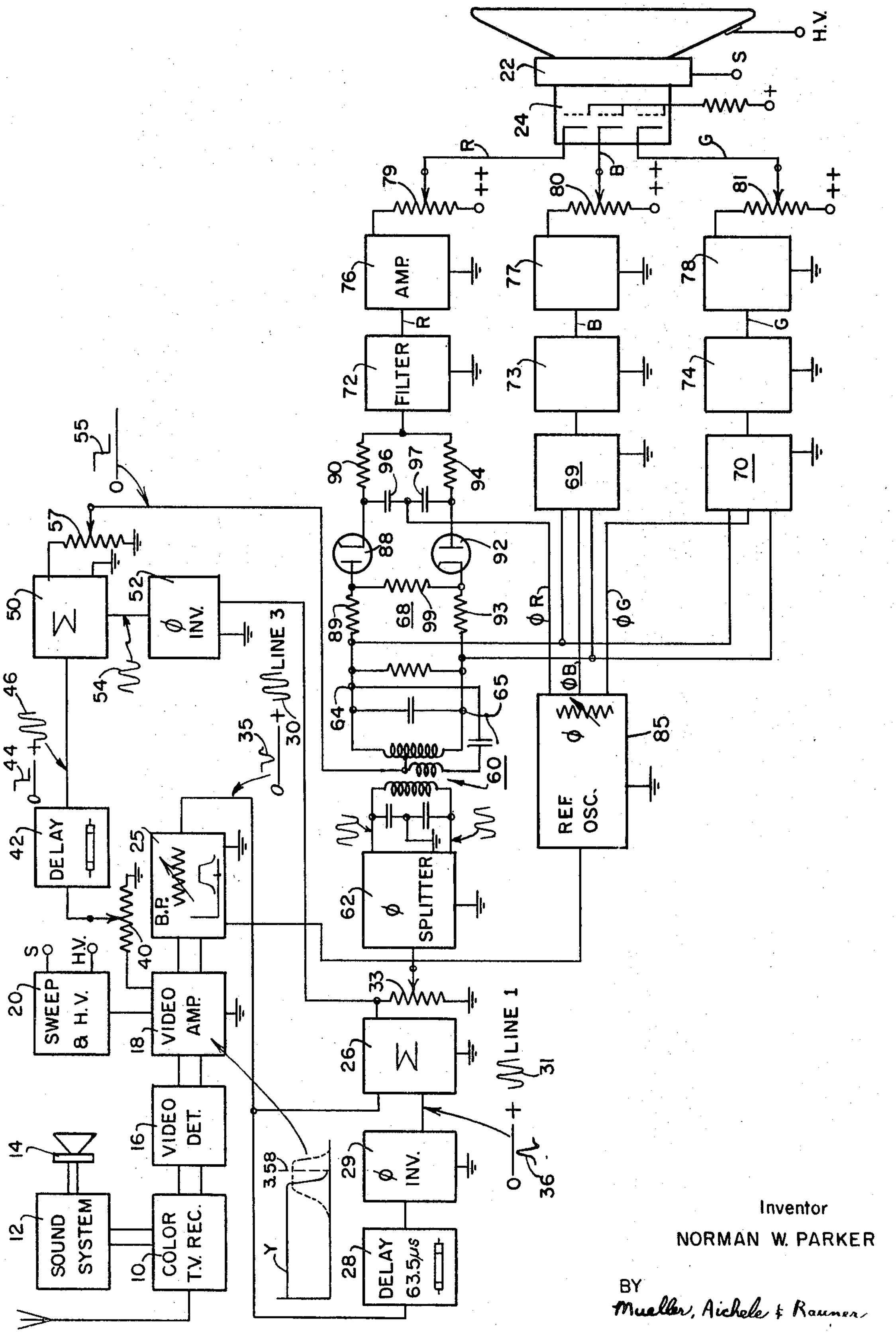
Inventor
NORMAN W. PARKER
BY
Mueller, Aichele & Rauner
ATTYS.

United States Patent Office 3,542,945

Patented Nov. 24, 1970

3,542,945
COLOR TELEVISION SIGNAL SEPARATION SYSTEM

Norman W. Parker, Wheaton, Ill., assignor to Motorola, Inc., Franklin Park, Ill., a corporation of Illinois Filed Sept. 11, 1967, Ser. No. 666,658
Int. Cl. H04n 9/38
U.S. Cl. 178—5.4 3 Claims

ABSTRACT OF THE DISCLOSURE

A band shared video frequency brightness signal and chroma modulated subcarrier are separated by band passing the subcarrier into an adder and also through a one horizontal deflection line, delay line and phase inverter to the adder to sum consecutively transmitted lines of the subcarrier and cancel interspersed brightness components. The separated subcarrier is subtracted from the brightness signal and color representative signals are directly developed from the recombined signals without a spurious pattern from signal interspersion.

INTRODUCTION

The NTSC color television signal in present use comprises a brightness or luminance frequency (Y) signal ranging in frequency from direct current to as much as about 3 mHz., and a 3.58 mHz. subcarrier which is modulated in phase and amplitude to represent hue and saturation of the image. The usual practice has been to synchronously demodulate the subcarrier to produce color difference signals $R-Y$, $B-Y$ and $G-Y$, which are combined with the Y signal for reproduction of red, blue and green signal information.

In accordance with known analysis, the spectrum of the video brightness signal is composed mainly of energy at discrete frequencies concentrated near the even harmonics of the line deflection frequency. For example, see the U.S. patent to Gray Pat. No. 1,769,920, issued July 8, 1950. The modulated color subcarrier also has such energy concentration, so that band sharing or interspersion of the Y and subcarrier signals is accomplished by making the subcarrier frequency an odd harmonic of one-half of the line deflection frequency. This causes the sideband energy in the modulated subcarrier to intersperse with the energy bunches of the brightness signal, and, of course, results in economy of transmitted bandwidth for the television signal.

While this band sharing conserves spectrum, in order to separate the subcarrier signal for adjusting its amplitude (for color intensity control) or for demodulation, there is a problem to select only the subcarrier and its sidebands without also including the high frequency brightness components. Conversely, the full range brightness or Y signal will include the color subcarrier, even if the Y range is limited, since the subcarrier modulation may extend below 3.59 mHz. by over 1 mHz. The appearance of either the Y signal in the subcarrier or the subcarrier in the Y signal can introduce undesirable patterns and distortion of the reproduced television image. Prior attempts to separate the signals using so-called comb filters (with alternating pass and stop bands) or using step type filters, have not been fully satisfactory due to the expense and difficulty of properly constructing such filters.

An object of this invention is to provide a simple and economical circuit for canceling the brightness signal in the chroma subcarrier and for canceling the chroma subcarrier appearing in the brightness signal frequency band.

Another object is to provide a brightness and color signal separation system which develops a faithful reproduction of band shared signals so that the full video frequency range can be reproduced without spurious signal patterns.

Another object is to develop an uncontaminated color difference signal modulated subcarrier signal and brightness signal for application respectively in a balanced and unbalanced manner to demodulators for direct recovery of red, blue and green color representative video signals.

In a specific form of the invention the band selected chroma subcarier, together with the brightness signal components interspersed therewith, is coupled directly to one input of an adder circuit. Another input to the adder is the same band selected chroma subcarrier signal coupled through a phase inverter and delay line providing a delay equal to the time of one horizontal deflection line of the reproduced image. Since successively transmitted lines of the color signal are out-of-phase, the two inputs to the adder circuit combine as a summed color subcarrier for two lines (lines 1 and 3, for example, in the interlaced image). Since the brightness signal is of the same phase for the two image lines in question, the opposite phase inputs of the adder circuit result in cancellation of these brightness components. The uncontaminated brightness signal is developed by coupling a reverse phase form of the output of the adder circuit, which is the uncontaminated color subcarrier, to a further adder circuit which carries the brightness signal with the subcarrier contamination thereof. The separated signals are coupled into processing and translating circuitry to control the image reproducer. Specifically the pure brightness signal is applied unbalanced to an associated demodulator system and the pure subcarrier is applied balanced to the demodulator system. The demodulator sections each include a pair of switches alternately conductive by the proper phase of the color subcarrier to directly produce red, blue and green representative video signals.

DETAILED DESCRIPTION

The drawing shows a color television receiver, partly in block and partly in schematic, which illustrates the invention.

In the figure, the color television receiver circuitry 10 is coupled to an antenna to select and amplify a desired signal which is converted to intermediate frequency. The circuitry 10 is coupled to a sound system 12 which responds to the usual 4.5 mHz. sound subcarrier. This system 12 selects, limits and demodulates this signal, and amplifies it sufficiently to drive loudspeaker 14.

The receiver circuitry 10 is coupled to a video detector 16 to demodulate the intermediate frequency video signal which is then applied to the video amplifier circuit 18. The signal in the amplifier 18 includes the usual vertical and horizontal synchronizing pulses, the video frequency brightness signal represented as Y, the 3.58 mHz. (approx.) modulated color subcarrier signal and the color reference burst at 3.58 mHz. included on the trailing portion of the horizontal synchronizing pulses.

The video amplifier 18 supplies a signal to the sweep and high voltage system 20 which selects the vertical and horizontal synchronizing pulses (at 60 Hz. and 15.75 kHz.) to provide appropriate sweep signals to the deflection yoke 22 on the neck of the tri-beam cathode ray picture tube 24. System 20 also provides high voltage for the screen of the picture tube which may be of the shadow mask type presently in widespread use.

The composite video signal available in amplifier 18 is comprised of the video frequency brightness components which may extend in frequency to 2 mHz. and oftentimes to over 3 mHz. The color subcarrier signal is modulated in phase to represent color difference signals, $R-Y$, $B-Y$ and $G-Y$. The hue information is represented by the phase of the color subcarrier whereas the saturation information is represented by the amplitude of the color subcarrier. As previously stated, the exact frequency of the color subcarrier is selected to be an odd multiple of one-half the line deflection frequency so that the energy bunches of the Y signal are interspersed with the energy bunches of the sidebands of the color subcarrier signal. The modulated color subcarrier signal can extend in a range from less than 3 mHz. to more than 4 mHz.

The exact makeup of the color signal as established by the NTSC standards can be expressed by the following equations:

(A) $E_M=E_Y+[E_Q \sin(\omega t+33°)+E_I \operatorname{Cos}(\omega t+33°)]$
(B) $E_Y=0.30E_R+0.59E_G+0.11E_B$
(C) $E_Q=0.41(E_B-E_Y)+0.48(E_R-E_Y)$
(D) $E_I=-0.27(E_B-E_Y)+0.74(E_R-E_Y)$
(E) For color signals below 500 kHz:

$$E_M=E_Y+0.493(E_B-E_Y)\sin\omega t+0.877(E_R-E_Y)\operatorname{Cos}\omega t$$

For color signals .5–2 mHz. the $E_Q$ term is zero in Equation A.

While the above equations express the mathematical relationship among the signal components of the NTSC broadcast signal, a detailed analysis of these equations is unnecessary for an understanding of the signal separation system described herein.

One output of the video amplifier 18 is coupled to the bandpass filter 25 which selects the color subcarrier with its sideband and includes a gain control providing the action of a color intensity adjustment in the receiver. From the preceding discussion of the composite color television signal it may be seen that the band selected signal energy in the filter 25 will extend into the frequency range at the upper end of the luminance passband in a region around 3 mHz. In order to cancel the brightness components from the modulated color subcarrier signal, the output of bandpass filter 25 is coupled directly to the signal adder 26, and the output of filter 25 is further coupled through the delay line 28 and the phase inverter 29 to the signal adder 26. The delay line 28 serves to delay the entire signal applied thereto for a time of 63.5 microseconds which is the exact time of one horizontal deflection line of the image as reproduced by the tube 24 under control of the vertical and horizontal deflection system 20. This delay time, of course, contemplates the common horizontal deflection frequency of 15.734 kHz. The circuit 29 merely phase inverts the delayed signal as applied to the summing circuit 26.

With the color subcarrier established at an odd harmonic at one-half of the line deflection frequency, each succeedingly transmitted image line of the color subcarrier will be out-of-phase with the subcarrier signal of its preceding line. The television signal is commonly vertically interlaced so that one-half of the overall image lines are translated for one vertical field and the second half of the lines are interspersed therewith when the next field is received. As representative of the signal inputs to the adder 26 there is the color subcarrier 30 applied thereto directly from the bandpass filter 25. There is also a corresponding color subcarrier 31 through the delay and phasing circuit 28, 29 which would, having been delayed for one deflection line and phase inverted, now be at the same phase as signal 30. Accordingly the output of the adder circuit 26 will combine the two in-phase color signals 30 and 31 which are developed across the variable resistor 33. It should be recognized, that combination of the signals 30 and 31 will represent the average color between alternate lines and to this extend the vertical color resolution will be reduced. It should also be recognized that the signals 30 and 31 as shown are in actuality at a frequency of approximately 3.58 megacycles and are modulated in phase to represent hue and in amplitude to represent saturation.

Since the two inputs to the adder 26 will also include the brightness information in the region around 3 mHz., the pulse waveform 35 represents that energy applied to the adder directly from the bandpass filter 25 and the pulse 36 represents corresponding brightness information passed through the delay and phasing circuits 28, 29. Pulses 35 and 36 would assume various waveforms, but in the example under discussion are intended to represent high frequency components of a brightness step or shift from light gray to dark gray in the image. The brightness components 35 and 36 are out-of-phase due to the phase inverter 29 and they will closely correspond since they are in alternately transmitted horizontal deflection lines of the image. Accordingly, the brightness components 35 and 36 will cancel one another in the adder circuit 26 thereby providing relatively pure modulated color subcarrier signals across the output potentiometer 33.

The color receiver further operates to cancel the lower sideband energy of the color subcarrier signal which appears in the upper region of the luminance signal range which would not be removed by a usual low pass filter without losing brightness detail. To accomplish this the full range luminance signal Y and the color subcarrier appearing in the video amplifier 18 are applied across the variable resistor 40. In a practical embodiment this range may extend to as high as 4 mHz. and even somewhat higher. This wideband video signal is then applied to a delay line 42 which compensates for the delay that is experienced by the color subcarrier in passing through its channel including the bandpass filter 25, the delay line 28, phase inverter 29, etc. Accordingly at the output of the delay line 42 there appears the full Y or brightness signal 44, here represented as a step in brightness of the image from dark gray to light gray, and the full color modulated subcarrier signal represented as the waveform 46.

To cancel hte undesired subcarrier component 46 in the brightness signal the signals 44 and 46 are applied to the adder 50. The second input to the adder 50 is applied from the output of the adder 26 through the phase inverter 52. This signal 54 is a phase inverted form of the color subcarrier as developed without contamination of the high frequency luminance components. Since the color subcarrier signals are applied to the adder 50 in phase opposition they will be canceled to result in a brightness signal 55 at the output of the adder 50 which is developed across the variable resistor 57 that forms a contrast control for the receiver by varying the amplitude of the brightness signal energy which is eventually applied to the guns of the cathode ray tube 24.

The decontaminated luminance signal 55 is applied to the center tap of the secondary of the direct demodulator input transformer 60. The decontaminated chroma modulated subcarrier is applied to the phase splitter 62 which provides opposite phases of the subcarrier across the primary of transformer 60, with respect to a grounded neutral center point.

The secondary of transformer 60 has an output lead 64 and a further output lead 65. Both of these leads carry the luminance components 55 with respect to ground. Lead 64 carries the modulated subcarrier of one phase, whereas lead 65 carries the modulated subcarrier of opposite phase. The leads 64 and 65 are each coupled to direct color signal demodulators 68, 69 and 70. These demodulators respectively provide output signals to the associated filters 72, 73 and 74 which are coupled to the respective video amplifiers 76, 77 and 78. Red, blue and green representative video signals are developed by the associated amplifiers 76–78 across the variable drive control resistors 79, 80 and 81. The arms of these resistors are coupled to the individual electron guns in the picture tube 24. The associated grids and cathodes are established with proper bias in accordance with known principles so that the image is produced in response to the signals.

In order for the demodulators 68–70 to function properly the color reference signal transmitted with the television signal is gated in known manner from the bandpass filter 25 and applied to the reference oscillator 85. Oscillator 85 may include a color or chroma control to adjust the phase of its signal and provide a shift in the hue of the image. The oscillator 85 further includes three outputs of the reference signal at 3.58 mHz. and respective phases for demodulation of the desired hues.

Operation of the direct demodulator for the red representative signal will be described, and it should be recognized that the demodulators 69 and 70 for the blue and green signals function in a corresponding manner although operating at different phases of the subcarrier signal.

The direct color signal demodulator 68 includes a first diode 88 coupled in series with resistors 89 and 90 between the input lead 64 and the filter 72. A second diode 92 is coupled in series with resistors 93 and 94 to the filter 72. A signal of proper phase for synchronous demodulation of the red representative signal is applied from the oscillator 85 through the capacitors 96 and 97 respectively to the cathode of diode 88 and anode of diode 92.

It may be seen that diodes 88 and 92 are oppositely polarized and that the color reference signal is applied to the diodes with the same phase. Furthermore the input to the two diodes comprises opposite phases of the modulated color subcarrier signal and the same phase of the luminance signal 55. During the first half cycle of the color reference signal from oscillator 85, diode switch 88 will conduct and translate a portion of the luminance signal and a portion of a proper phase of the associated amplitude to the color subcarrier to produce a signal component representing the red information at the filter 72. During the next half cycle of the color reference signal, the diode 92 will conduct on the same phase and next half cycle of the croma subcarrier to similarly pass a signal portion of the red representative signal to filter 72. This operation amounts to full wave demodulation of the color subcarrier signal along with gating of the associated Y or luminance signal. Filter 72 is of a low pass type to establish an upper video bandwidth and at the same time integrate the signal portions conducted through the demodulator switch devices.

In direct demodulators of the prior art which have produced a color representative signal of proper amplitude for the brightness hue and saturation of the image, there has generally been a spurious signal component introduced due to the modulation of the brightness signal with the color reference signal used for synchronous demodulation of the subcarrier. However, in the system herein the luminance signal is applied unbalanced to the demodulator diodes or switches, whereas opposite phases of the modulated subcarrier are applied to these switches so that any spurious modulation component of the luminance at the 3.58 mHz. rate is canceled by an opposing spurious component from the other demodulator switch. Any reference signal and luminance modulation components are established as modulation sidebands around the frequency of twice the reference frequency, so that these can be filtered by the filter 72 since they would fall above the frequency range of interest for good video reproduction, namely 3 or 4 mHz.

The resistor 99 is coupled between the series resistors 89 and 93 respectively at the diodes 88 and 92. The resistor 99 is proportioned to establish the proper amplitude of the color subcarrier at each diode through voltage divider action in conjunction with resistors 89 and 93. Since there are opposite phases of the subcarrier at the ends of resistor 99 its value with respect to the value of resistors 89 and 93 will establish a desired amplitude of the subcarrier for each of the diodes 88 and 92. The luminance signal is applied equally through the leads 64 and 65 so that this signal will be virtually unaffected by the network 89, 93 and 99. In this way the luminance to modulated subcarrier ratio can be established in the demodulator to compensate for the adjustment which may be made in this ratio to avoid overdrive of a monochrome image reproducer by the combined luminance and subcarrier signals and consequent reduced cancellation visually on the screen.

The demodulators 69 and 70 correspond in configuration to the demodulator 68 except that resistor 99 would have different values in the other two demodulators to compensatae for the fact that the blue representative signal is transmitted at a greatly reduced amplitude and therefore needs increased drive to its demodulator (large value for resistor 99), whereas the green representative signal is transmitted at relatively great amplitude and therefore needs a lesser drive to its demodulator (small value for resistor 99) than either the red or the blue representative signal.

Certain parts of the color television receiver have been described in relatively great detail and others have been described only generally. Some of the portions of the receiver described generally may include other circuitry as is common in present day receivers. For example, there can be a gated automatic gain control system constructed in accordance with known practice, and there may be a killer circuit for interrupting the channel through bandpass amplifier 24 in the absence of reception of burst control signal for the oscillator 85. It should further be noted that it is preferable for the video detector 16 to be direct current coupled through all of the succeeding stages directly to the cathode of the picture tube 24 in order to maintain the direct current component of the signals in the various translation paths and faithfully reproduce the transmitted image.

Accordingly the receiver described herein provides a color television signal translation system and demodulation circuitry which separates and decontaminates both the color subcarrier signal, as well as the luminance signal, even though these signals are transmitted in band shared form so that both signals may be demodulated without undesired components of the other. Such a system avoids the developing of spurious energy components in the video signals that are developed so that the present system would provide relatively pure color subcarrier signals and luminance signals especially for direct demodulation thereof in a way to avoid introduction of spurious signal components thereby to produce high quality red, blue and green representative signals.

I claim:

1. A color television receiver circuit for using a composite NTSC signal comprising brightness signal components in a given frequency range to be displayed by a cathode ray tube as image lines of an overall image scanned at a horizontal deflection rate and a subcarrier signal modulated with hue and saturation information, at least a portion of the modulation components of the subcarrier signal lying within the given frequency range, and consecutively transmitted image lines of the subcarrier signal being in phase opposition, including in combination, first circuit means for selecting the subcarrier signal, means for applying said composite signal to the input of said first circuit means, a delay and phase-reversing second circuit means coupled to the output of said first circuit means for providing a phase reversed and time delayed form of the subcarrier signal, said time delay corresponding to the time for scanning one image line, third circuit means responsive to the output of the first and second circuit means for combining said outputs to produce a subcarrier signal free of brightness signal components, fourth circuit means for subtracting the signal developed by said third circuit means from the brightness signal components, means for applying the brightness signal components and the output of the third circuit means to the fourth circuit means, and a subcarrier demodulation and brightness signal combining circuit coupled to the outputs of said third and fourth circuit means for controlling the cathode ray tube with uncontaminated brightness signal components and color representative signal components.

2. The combination of claim 1 in which said subcarrier demodulation and brightness signal combining circuit includes a pair of switching devices and means controlling the same to be alternately conductive at the subcarrier frequency and at a phase associated with a given hue, circuit means responsive to the output of the third circuit means for applying opposite phases of the subcarrier signal from said third circuit means to said switching devices, further circuit means responsive to the output of the fourth circuit means for applying the output signal from said fourth circuit means to said switching devices at the same phase.

3. A color television signal translating circuit for a composite NTSC signal comprising brightness signal components in a given frequency range to be displayed by a cathode ray tube as image lines of an overall image scanned at a horizontal deflection rate and a subcarrier signal modulated with hue and saturation information, at least a portion of the modulation components of the subcarrier signal lying within the given frequency range, consecutively transmitted image lines of the subcarrier signal being in phase opposition, including in combination:

filter means for selecting the carrier signal including the portion thereof in the given frequency range;

means for applying said composite signal to the input of said filter means;

a delay and phasing circuit coupled to the output of said filter means and including phase inversion means and a signal delay device providing a signal delay of the time interval required to scan one image line;

first adder circuit means coupled to the output of said filter means and to the output of said delay and phasing circuit to combine the selected subcarrier signal of one image line with a phase inverted form of the signal for the last preceding image line to produce a subcarrier signal substantially free of brightness signal components;

a brightness signal coupling circuit carrying the brightness signal components and at least a portion of the modulated subcarrier signal with a given phase;

means for applying said composite signal to said brightness signal coupling circuit;

second adder circuit means;

means coupling the output of said brightness signal coupling circuit to an input of the second adder circuit means;

phase inversion coupling means responsive to the output of the first adder circuit means for coupling and inverting the output of said first adder circuit means to a second input of the second adder circuit means, said second adder circuit means producing brightness signal components substantially free of said subcarrier signal; and video signal processing and translating circuit means responsive to the outputs of said first and second adder circuit means for producing signals to control the image of the cathode ray tube.

References Cited

UNITED STATES PATENTS

| | | | |
|---|---|---|---|
| 3,267,211 | 8/1966 | Melchior | 178—5.4 |
| 3,333,054 | 7/1967 | Melchior et al. | 178—5.4 |
| 3,433,980 | 3/1969 | Swaluw | 178—5.4 |

RICHARD MURRAY, Primary Examiner

G. G. STELLAR, Assistant Examiner